Sept. 13, 1938.                R. GUNDLACH                2,130,006
                        PERISCOPE FOR ARMORED VEHICLES
                            Filed Jan. 28, 1936
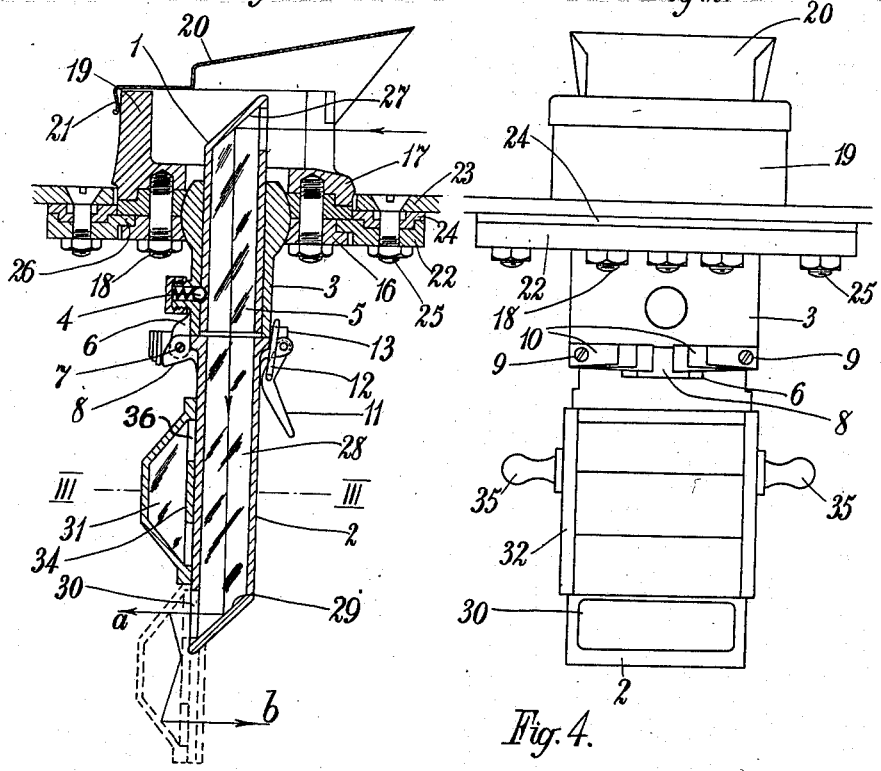
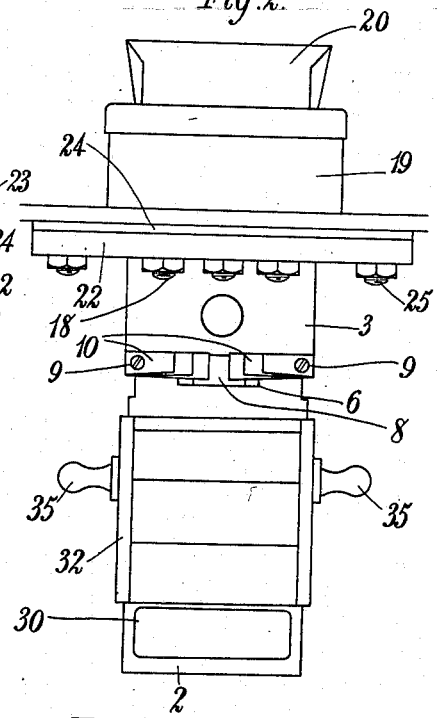
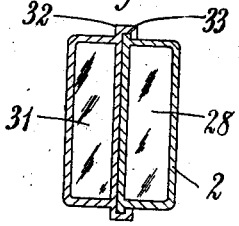
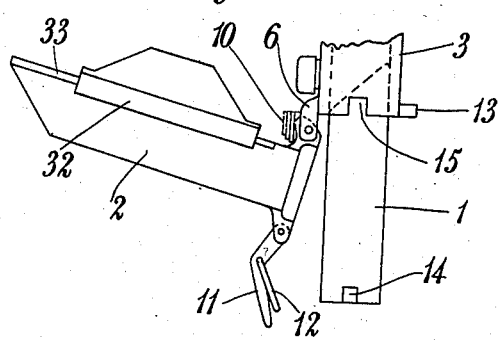

Patented Sept. 13, 1938

2,130,006

UNITED STATES PATENT OFFICE 2,130,006

PERISCOPE FOR ARMORED VEHICLES

Rudolf Gundlach, Warsaw, Poland

Application January 28, 1936, Serial No. 61,227
In Belgium February 4, 1935

3 Claims. (Cl. 88—70)

The object of the present invention is a periscope for all kinds of armored vehicles. In the periscope according to the invention the optical system is divided in two separate parts, namely the objective part and the ocular part, the objective part which is arranged in a wall or roof of the vehicle so as to permit insertion and exchange thereof.

In the case of the objective part being destroyed by a bullet it is not necessary to change the complete periscope as the destroyed objective part only may be easily removed and replaced by another objective part, prepared for this purpose.

In order to prevent bending of the torn surfaces of the casing of the objective part when destroyed by a bullet, in consequence of which it would be impossible to remove the destroyed objective part from its case, the casing is made of a very brittle and easily breakable material.

The objective part is preferably arranged in a case, which is provided with cylindrical surfaces by means of which it is swingably mounted in a bearing rotatably arranged in a securing ring.

According to the present invention the ocular part may be provided with a device for deflecting light rays through an angle of 180°, the device being movably secured on the ocular part so that at the place of emersion of the light rays it may be shifted thus enabling the observer to see behind him without turning his head. The device, moreover, is arranged so that the image will appear in its normal position.

The ocular part is swingably suspended on the case of the objective part, so that by swinging up the ocular part the passage for removing the objective part which is to be exchanged is free.

In the drawing the object of the invention is shown by way of an example:

Fig. 1 is a sectional view of the periscope;

Fig. 2 is a front elevation of the said periscope;

Fig. 3 is a cross-sectional view along the line III—III of Fig. 1, and

Fig. 4 is a side view of the swingable part of the optical system in the swung-up position.

The optical system is composed of two separate parts, one being the objective part 1 and the other being the ocular part 2. The objective part 1 is an exchangeable one and is pushed into a case 3. The objective part 1 is held in place by a spring pressed ball 4 penetrating into a recess in the casing of the glass prism 5. In the protruding outer end of the casing a rectangular opening is provided through which the light rays enter the prism and are deflected at an angle of 90° by the inclined surface 27 of the same.

The case 3 is provided with two shoulders 6 to which the ocular part 2 is secured so as to be able to swing on the axle 7. The ocular part is provided with a shoulder 8 arranged between the two shoulders 6. To each of the shoulders 6 a flat spring 10 is secured by means of screws 9. Each flat spring 10 consists of three steel leaves. The springs 10 press the shoulder 8 of the ocular part which is formed so that the springs 10 automatically throw the ocular part 2 either in the operating position shown in Fig. 1 or in the swung-up position shown in Fig. 4. To swing-up the ocular part 2 a rather great pressure must be exerted by hand. But by means of the springs 10 the ocular part 2 may be brought quickly and surely to the swung-up position, the objective part 1 being then quickly and easily exchanged. The ocular part 2 being returned to the operating position, the pressure of the springs is sufficiently great to hold the ocular part 2 in the operating position. Then the catch consisting of a lever 11 and a clamp 12 may be locked, the clamp 12 being placed on the projection 13 provided on the case 3 and the lever 11 being pressed down by the thumb. To facilitate the removal of the objective part 1, it is provided with projections 14, as shown in Fig. 4, adapted to enter the slots 15 in the case 3.

The case 3 is provided with cylindrical surfaces for swingably suspending it in the bipartite bearing 16. The two disk-like parts of the said bearing are screwed together and to the cover plate 17 by means of screws 18. On the cover plate 17 a wall 19 is arranged which surrounds on three sides the outwardly protruding end of the objective part 1 and forms a shield against gun bullet fire. Towards the top the objective part 1 is free. During rainy or snowy weather the armored wall 19 may be covered with a rooflike cover 20 of sheet metal. For this purpose the cover 20 is provided with a correspondingly bent flange 21 surrounding the armored wall 19.

In order that the lead of the bullets falling on the armored wall 19 is prevented from getting between the bearing surfaces the armored wall 19 is mounted at a rather great horizontal distance from the sliding surface of the swingable bearing.

The ring 22 is for the purpose of mounting the complete periscope. The fastening ring 22 is secured by means of screws 25 to the armored plate 23 of the vehicle by interconnecting a packing ring 24 of felt or another elastic material. On the fastening ring 22 is rotatably mounted the bipartite bearing body 16. The inner surface of the fastening ring 22 is provided with an annular shoulder 26 arranged in the groove formed between the two disklike parts of the bearing 16. The inner edge of the packing ring 24 bears against the outer edge of the rotatable bearing body 16 thus forming the packing of the bearing surfaces. The packing ring 24 operates also as a shock-absorber and insulates the periscope against violent shocks of the vehicle. Moreover, the soft felt ring is accomodated to the small dents to which the armor plate 23 is often subjected.

The light rays deflected downwardly by the deflecting surface 27 pass through the prism 5 and the prism 28 in the ocular part 2, being again deflected at an angle of 90° by the inclined deflecting surface 29. Then the light rays pass from the prism through the rectangular opening 30 in the casing of the prism 28 and fall into the observer's eye in the direction of the arrow "a".

The ocular part 2 is provided with a device by means of which the light rays indicated by the arrow a may be deflected at an angle of 180°. The device consists of a double prism 31, the metal casing of which is provided with side edge-shoulders 32 surrounding the guide ribs 33 arranged on the ocular part 2, as seen in Fig. 3. According to the shape of the double prism 31, the inclined surfaces of the same and the side 34 directed to the prism 28 are provided with a reflecting silver layer for deflection of the light rays. The inclination angles may also be selected so as to make the mirror coating unnecessary. In order to look back the whole periscope with the armored wall 19 must be turned around the vertical axis through an angle of 180°. For this purpose two handles 35 are provided on the ocular part 2. At the same time the double prism 31 is shifted down along the guides 33 so that the opening 36 in the casing of the double prism 31 registers with the opening 30 in the casing of the prism 28. This position is shown by dotted lines in Fig. 1. The light rays deflected by the surface 29 pass through the double prism 31 and are so deflected by the inclined sides of the double prism 31 and by the surface 34 that they emerge from the double prism 31 through its ocular opening, in the direction of the arrow "b".

What I claim is:

1. A periscope for armored motor cars, endless track vehicles, railway cars and the like, comprising a tubular case, a rotatable bearing for the case, mounted in the roof of the vehicle, a packing ring around the rotatable bearing, an objective element mounted within the case and projecting above the upper end thereof, the cross sectional area of which is less than the smallest internal cross sectional area of the case so that it can be inserted in the case from the lower end, an ocular element swingably mounted on the lower end of the casing so that it can be swung away to allow of the objective part being exchanged, and an optical device for deflecting the light rays through 180° mounted slidably on the side of the ocular element and capable of being placed in front of the eye-piece thereof so that observations may be made from either side of the ocular element.

2. A periscope for armored vehicles comprising, an elongated case rotatably supported in an armored wall of the vehicle, an elongated objective element consisting of a glass prism having a brittle metal casing removably mounted within said case with an end thereof protruding outside the armored wall of the vehicle, said metal casing having an exterior surface of uniform cross-sectional area throughout the length thereof so as to be removable inwardly of the vehicle through the case, and ocular element swingably mounted on the inner end of the case to complete the periscope, whereby the ocular element may be swung away from the end of the case to permit the objective element to be removed from the inner end of the case.

3. A periscope for armored vehicles comprising, an elongated case swingably supported in an armored wall of the vehicle, an elongated objective element removably mounted within said case with an end thereof protruding outside the armored wall of the vehicle, said objective element having an exterior surface of uniform cross sectional area throughout the length thereof so as to be removable from the inner end of the case, a ring member fixed to the armored wall of the vehicle, a pair of discs rotatably mounted on said ring, said discs having arcuate shaped inner edges forming a bipartite bearing for the end of said case, the end of said case having cylindrical surfaces for engaging the arcuate inner surfaces of said discs, an armored plate surrounding the outer end of said objective element and having outwardly projecting walls, and means for securing said plate over said discs.

RUDOLF GUNDLACH.